(12) United States Patent
Burrows et al.

(10) Patent No.: US 7,533,754 B2
(45) Date of Patent: May 19, 2009

(54) HYBRID MOTOR VEHICLE DRIVELINE

(75) Inventors: Andrew Burrows, Moreton in Marsh (GB); Rob Barlow, Southam (GB)

(73) Assignee: Ford Global Technologies, LLC, Dearborn, MI (US)

( * ) Notice: Subject to any disclaimer, the term of this patent is extended or adjusted under 35 U.S.C. 154(b) by 331 days.

(21) Appl. No.: 11/676,018

(22) Filed: Feb. 16, 2007

(65) Prior Publication Data
US 2007/0193793 A1 Aug. 23, 2007

(30) Foreign Application Priority Data
Feb. 22, 2006 (GB) .................................. 0603452.4

(51) Int. Cl.
*B60K 17/344* (2006.01)
(52) U.S. Cl. ..................... 180/248; 180/247; 180/242; 180/243; 180/65.2; 180/65.3; 475/5
(58) Field of Classification Search ................ 180/248, 180/247, 242, 243, 65.2, 65.3; 475/5
See application file for complete search history.

(56) References Cited
U.S. PATENT DOCUMENTS

| | | | | |
|---|---|---|---|---|
| 5,562,566 | A * | 10/1996 | Yang | 477/3 |
| 6,059,059 | A * | 5/2000 | Schmidt-Brucken | 180/65.3 |
| 6,308,794 | B1 | 10/2001 | Oppitz | |
| 6,589,130 | B1 * | 7/2003 | Baginski et al. | 477/3 |
| 2003/0136597 | A1 * | 7/2003 | Raftari et al. | 180/242 |
| 2003/0216215 | A1 * | 11/2003 | Suzuki et al. | 477/5 |
| 2005/0121248 | A1 * | 6/2005 | Ushiroda et al. | 180/248 |
| 2006/0108166 | A1 * | 5/2006 | Tanaka et al. | 180/248 |
| 2006/0196714 | A1 * | 9/2006 | Sugimoto et al. | 180/242 |
| 2007/0029126 | A1 * | 2/2007 | Shigeta et al. | 180/247 |
| 2007/0193808 | A1 * | 8/2007 | Perakes et al. | 180/242 |

FOREIGN PATENT DOCUMENTS

| | | |
|---|---|---|
| EP | 0584090 B1 | 10/1994 |
| EP | 1533166 A2 | 5/2005 |
| GB | 2322345 A | 8/1998 |

* cited by examiner

*Primary Examiner*—Paul N Dickson
*Assistant Examiner*—Marlon A Arce
(74) *Attorney, Agent, or Firm*—David B. Kelley

(57) ABSTRACT

A hybrid motor vehicle (10) has a four wheel drive arrangement in which the front wheels (12 and 13) are driven by the engine (11) in two wheel drive mode and all four wheels (12-15) in four wheel drive mode. The engine is connected to the rear wheels (14 and 15) through an auxiliary driveline which includes a first clutch (22) to connect to the engine (11), a propshaft (23) and a differential (25). An electric motor (28) is connected to the propshaft (23) for the purpose of driving the vehicle either with or without the assistance of the engine (11). A second clutch (27) is located between the propshaft (23) and the differential (25). When the vehicle is in two wheel drive mode, the propshaft (23) is disconnected from both the engine (11) and the rear wheels (14 and 15) and on switching to four wheel drive mode when the vehicle is moving the propshaft (23) is firstly spun up to a speed matching that of the engine (11) and rear wheels (14, 15) by the action of the electric motor (28). Then the auxiliary driveline (21) is reconnected by engaging the first and second clutches (22, 27). This reduces any acceleration jerk perceived by the driver.

27 Claims, 5 Drawing Sheets

HYBRID MOTOR VEHICLE DRIVELINE

BACKGROUND OF THE INVENTION

This invention relates to drivelines for hybrid motor vehicles and in particular for motor vehicles such as all terrain vehicles which have selective two wheel drive or four wheel drive.

A hybrid motor vehicle is one which is equipped with a primary mover, such as an internal combustion engine and a secondary mover, such as an electric motor.

There are various known ways in which the primary and secondary movers can be arranged in order to drive the vehicle and they may be arranged to drive either one axle or two.

EP0584090 discloses a hybrid vehicle having permanent four wheel drive. The vehicle is provided with an internal combustion engine and an electric motor. The electric motor is combined with the rear differential and can provide drive to the front wheels via a drive shaft and to the rear wheels via the rear differential.

It is also known to configure a hybrid vehicle so that it may be selectively driven either by the engine or the electric motor or by both power sources simultaneously. One or more clutch arrangements may be used.

U.S. Pat. No. 6,308,794 discloses a hybrid drivetrain which utilises two clutches. A first clutch is provided between the engine and the transmission. A second clutch is integrated with the electric motor and allows for disengagement of the motor from the transmission during operation of the engine.

Some conventional (i.e. not hybrid) all terrain vehicles which have a four wheel drive system are provided with a means of disconnecting two of the driving wheels when the vehicle is driven on less challenging terrain e.g. "on road". An example of such a four wheel drive system is shown in U.S. Pat. No. 5,105,901 in which the drive to the rear wheels may be broken through a clutch device to establish two wheel drive when four wheel drive is not necessary. The drive to the rear wheels is also controlled by wheel clutches which are utilised for controlling the torque distribution between the right and left rear wheels to improve controllability when cornering.

During two wheel drive conditions, the driveline components connected to the rear wheels may be caused to rotate due to frictional drag between the components in the driveline. This driveline drag is a major contributor to fuel inefficiencies and ways have been sought to minimise the residual drag in four wheel drive systems operating in two wheel drive mode. One method of reducing driveline drag is to disconnect the main rear wheel drive shaft (propshaft) from the rear wheel rear drive shafts by using a differential of the type sold by GKN under the name of the TFS free running differential. This differential allows the rear drive shafts to be disconnected from the differential casing so that there are no losses between the differential bevel gears and the pinions and no drive to the main drive shaft. Such systems are generally switched between four wheel drive mode and two wheel drive mode when the vehicle is stationary.

The present invention seeks to utilise a hybrid vehicle configuration to provide a four wheel drive system in which the reconnection between two wheel drive mode and four wheel drive mode may be made in a smooth manner while the vehicle is being driven. This may be termed "dynamic driveline reconnect". However, a problem with dynamic driveline reconnection is that the reconnection may be felt by the driver as an unacceptable "jerk", i.e. a spasmodic acceleration.

One known arrangement for minimising the jerk felt in a conventional vehicle when the reconnection is made is disclosed in GB-A-2407804. In one embodiment of this known arrangement, the propshaft is decoupled from the engine and the rear wheels by means of clutch arrangements at each of its ends. A reasonably smooth transition from two wheel drive to four wheel drive is achieved by firstly re-engaging one of the two clutches, allowing the propshaft to spin up to the rotational speed of the engine (or rear wheels) and then re-engaging the other clutch. A problem with this known arrangement is that a jerk may still be felt when the first clutch re-engages. Further, there is a delay in transferring from two wheel drive to four wheel drive while the partially reconnected driveline is spinning up.

SUMMARY OF THE INVENTION

The present invention proposes a means of spinning up a driveline prior to its reconnection to the engine and rear wheels by using the electric motor, which is primarily provided as the secondary mover in a hybrid vehicle.

According to one aspect of the present invention there is provided a motor vehicle having an engine, two pairs of wheels, a driveline to connect the engine to the wheels such that one pair of wheels is driven by the vehicle engine when the vehicle is in a two wheel drive mode and the other pair of wheels is additionally connected to the engine when the vehicle is in a four wheel drive mode, the driveline including an auxiliary driveline which includes a first clutch means to connect to the engine, a differential downstream of the first clutch means, a propshaft connected between the first clutch means and the differential, and releasable torque transmitting means operable to connect and disconnect drive from the propshaft to said other pair of wheels, the vehicle further including an electric motor coupled to the auxiliary driveline, and control means operable to switch the vehicle between the four wheel drive and the two wheel drive modes such that in the two wheel drive mode the propshaft is disconnected from both the engine and said other pair of wheels and when switching the vehicle from the two wheel drive mode to the four wheel drive mode while the vehicle is moving the control means firstly activates the electric motor causing it to spin the propshaft up to a predetermined speed, and subsequently operates the first clutch means and the releasable torque transmitting means to connect the auxiliary driveline to the engine and to said other pair of wheels.

Hence the electric motor is employed to spin the propshaft up from rest (while in the two wheel drive mode) to a rotational speed which, preferably, matches the speed of the engine and the rear wheels before reconnection of the auxiliary driveline to the engine and the rear wheels occurs. This ensures that the changeover to four wheel drive is achieved without any noticeable jerk. Furthermore, the electric motor can spin the propshaft up to the predetermined speed very quickly compared with the known arrangement described above.

The predetermined speed may be computed by the control means given the engine speed or the speed of the wheels (as measured by conventional on-board sensors) and knowledge of the driveline gearing ratios.

The first clutch means and releasable torque transmitting means may be re-engaged simultaneously.

The control means may be connected to the output of a driver operable switch which allows the driver to select a desired drive mode from the two wheel drive mode and the four wheel drive mode.

The control means may also be configured to receive signals indicative of vehicle operating conditions and be operable to switch from the two wheel drive mode to the four wheel drive mode when various vehicle operating parameters have been detected.

In a further refinement, once the propshaft has been spun up to the predetermined speed but just prior to reconnection, the control means may cause the engine to increase its output torque to match the torque absorbed by the auxiliary driveline by way of the sudden increase in inertia and frictional drag.

The first clutch means may comprise a wet clutch.

The releasable torque transmitting means may comprise a second clutch means located between the propshaft and the differential or, alternatively, between the differential and the other pair of wheels.

In an alternative arrangement the releasable torque transmitting means is incorporated within the differential, for example a free running differential.

The electric motor may be geared directly to the propshaft or connected via a clutch mechanism. A conventional epicyclic geared coupling may be employed.

Alternatively the electric motor may be connected to the crown wheel of the differential, either directly or via a clutch arrangement.

The motor and drivetrain may be configured so that the vehicle is driven solely by the engine, solely by the motor or by both engine and motor.

The invention also provides, according to another aspect thereof, a method of controlling a change in the transmission of torque from a motor vehicle engine to the driving wheels in a motor vehicle having a driveline and two pairs of wheels, one pair of wheels being driven by the engine when the vehicle is in a two wheel drive mode and the other pair of wheels being additionally connected to the engine when the vehicle is in a four wheel drive mode, the driveline including an auxiliary driveline and an electric motor coupled thereto, the auxiliary driveline including a first clutch means to connect to the engine, a differential downstream of the first clutch means, releasable torque transmitting means operable to connect and disconnect the drive from the differential to said other pair of wheels, and a propshaft connected between the first clutch means and the differential, wherein the propshaft is disconnected from both the engine and said other wheels when the vehicle is in two wheel drive mode and, on switching the vehicle from two wheel drive mode to the four wheel drive mode while the vehicle is moving, the electric motor rotates the propshaft until a predetermined rotational speed is reached, whereupon the auxiliary driveline is reconnected to the engine and to said other pair of wheels.

BRIEF DESCRIPTION OF THE DRAWINGS

The invention will be described by way of example only and with reference to the accompanying drawings, in which.

DETAILED DESCRIPTION OF THE PREFERRED EMBODIMENTS

Figure 1:
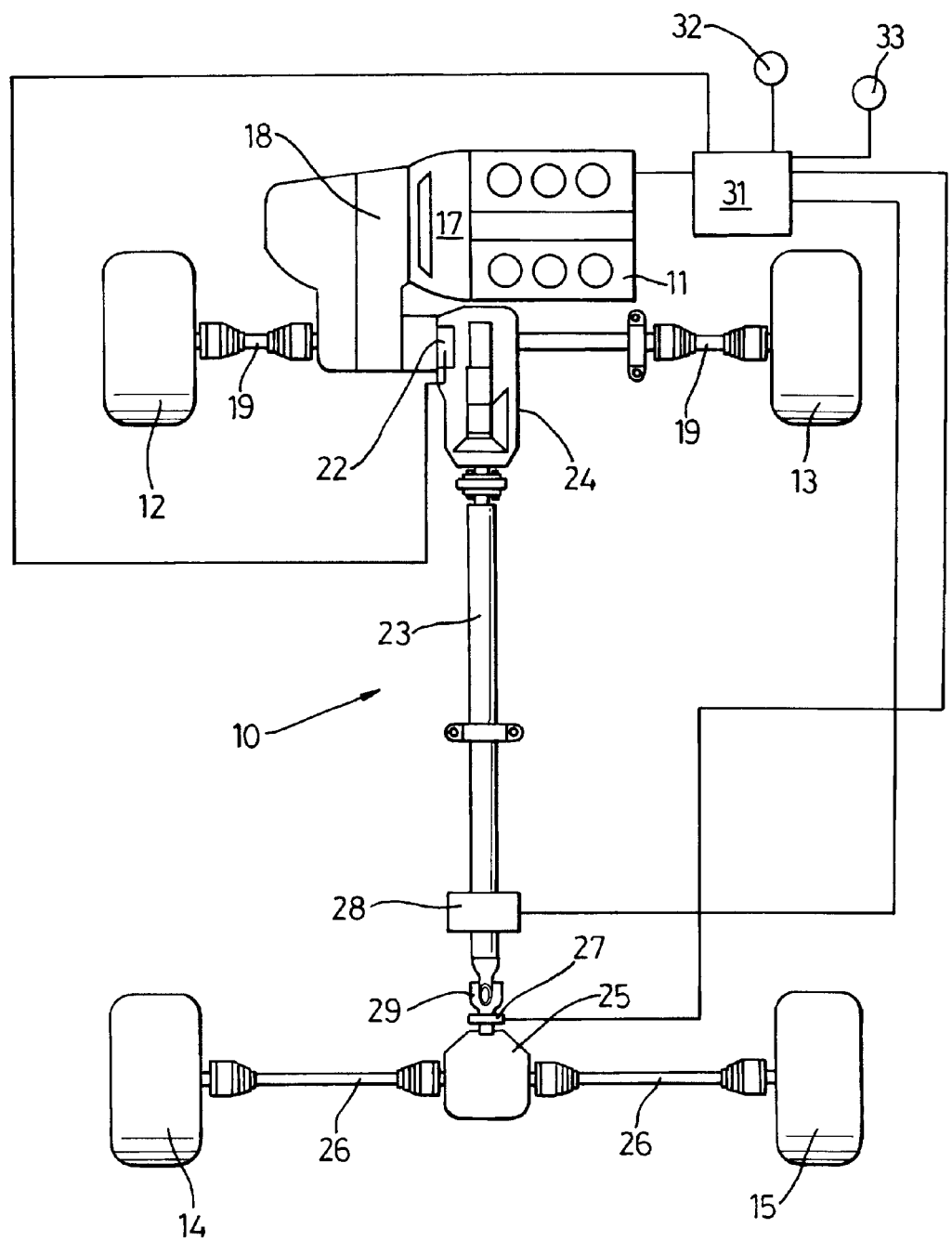
FIG. 1 is a schematic layout of the driveline of a first example of a motor vehicle according to the present invention.

With reference to FIG. 1, there is shown in schematic form the driveline of a four wheel drive vehicle 10 having a pair of front wheels 12, 13 and a pair of rear wheels 14, 15. The vehicle is driven by an internal combustion engine 11, e.g. a diesel engine or petrol engine, mounted transversely at the front of the vehicle. The torque output from the engine 11 is connected to a gearbox 18 conventionally through a friction clutch 17. The gearbox 18 drives the two front wheels 12, 13 when the vehicle is in two wheel drive mode and is connected thereto by a conventional differential (not shown) and drive shafts 19.

The engine 11 can also drive the rear wheels 14, 15 through first clutch means in the form of a PTO (Power Take-Off) clutch 22, typically a multiplate wet clutch, driven only when four wheel drive mode is operable. The PTO clutch 22 is connected to a longitudinally extending propshaft 23 through a transmission assembly 24. The propshaft 23 is in turn connected to a rear wheel differential 25 through a universal joint 29 and clutch 27.

An electric motor 28 is coupled to the propshaft 23 by means of an epicyclic gearing arrangement (not shown).

The differential 25 drives a pair of rear drive shafts 26 each of which is connected to a respective rear wheel 14 or 15.

By selective control of the PTO clutch 22 and the clutch 27 it is possible to disconnect the propshaft 23 and transmission 24 from the rear wheels 14, 15 when the vehicle is in two wheel drive mode. This reduces driveline drag and can reduce fuel consumption. The PTO 22, electric motor 28 and the clutches 27 are controlled by a controller 31.

The controller 31 receives wheel speed information from a wheel sensor 32 and propshaft rotational speed information from the electric motor 28. The controller also receives an input from a driver operable switch 33 which enables the driver to select a two wheel drive or four wheel drive mode.

When the vehicle is being driven in two wheel drive mode, the PTO clutch 22 and the clutch 27 (located between the propshaft 23 and the differential 25) are both disengaged. In this mode, only the front wheels 12, 13 are being driven by the engine 11 with the rear wheels 14, 15 drive shafts 26, and differential components freely rotating. The propshaft 23, transmission 24 and electric motor 28 are stationary.

In order to prepare the vehicle for a dynamic change from two wheel drive to four wheel drive (dynamic driveline reconnect) and to render the change acceptable to a driver, it is necessary to minimise the acceleration forces acting on the driver during the change. This is achieved by "spinning up" the propshaft 23 before connecting the engine drive through to the rear wheels so that the rotational speed of the propshaft 23 substantially matches the speed when driven by the engine and/or the rear wheels 14, 15.

When the driver operates the switch 33, thereby requesting a change to four wheel drive mode, the controller 31 responds by activating the electric motor 28 which, in turn, begins the spin up the propshaft 23. The transmission will also rotate as it is connected to the propshaft 23. While the propshaft 23 is spinning up, the controller 31 monitors wheel speed (by means of the sensor 32) and electric motor speed. From these measurements and knowledge of the driveline gearing ratios it can deduce the optimum moment for reconnecting drive from the engine 11 to the rear wheels 14, 15 in order to minimise any jerkiness which may be perceptible to the driver. The drive is reconnected by closing clutches 22 and 27.

The embodiment of FIG. 1 can perform as a hybrid vehicle as the electric motor 28 can provide torque to the rear wheels 14, 15 via the propshaft 23 and clutch 27 and/or to the front wheels 12, 13 via PTO clutch 22.

Figure 2:
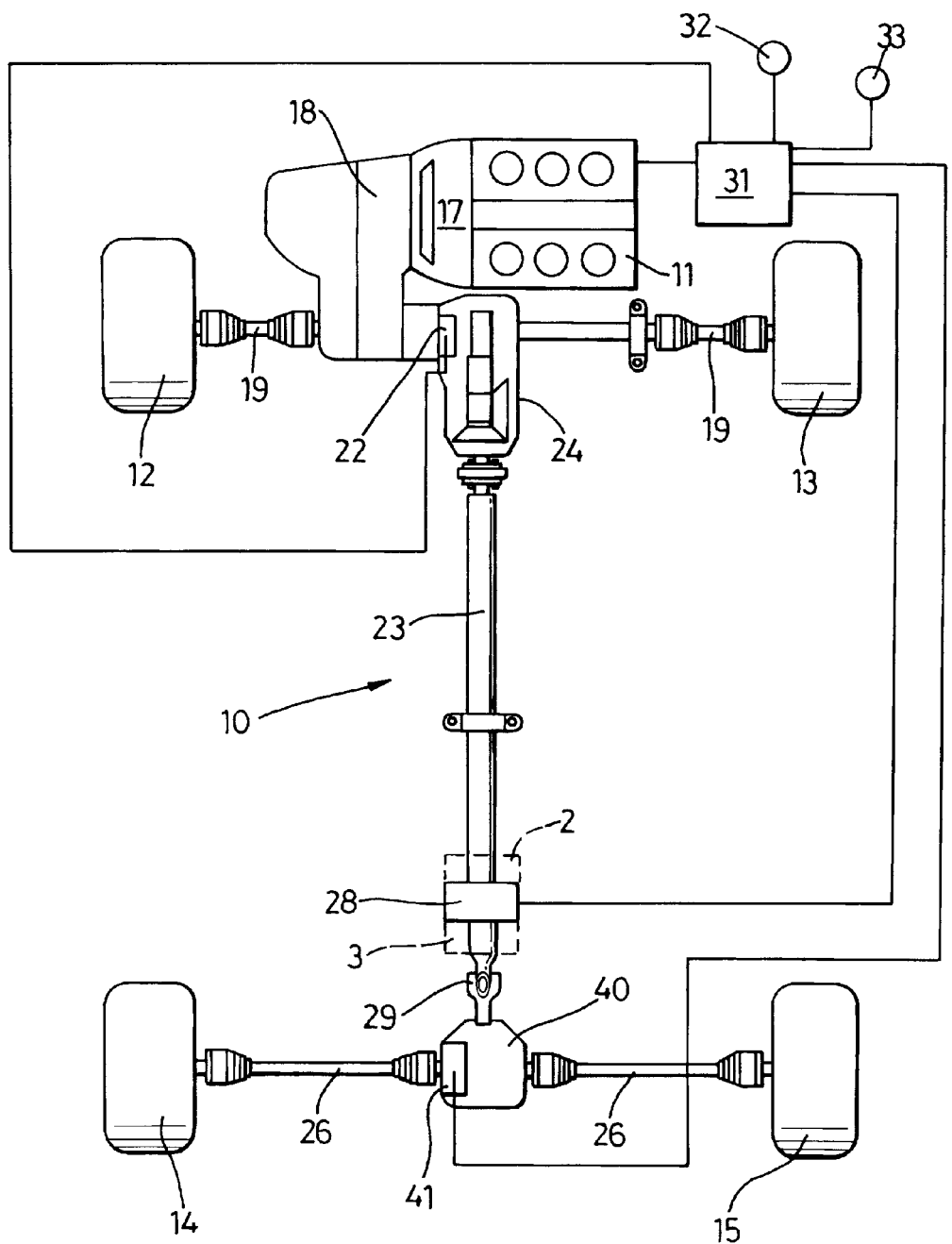
FIG. 2 is a schematic drawing of the driveline of a second example.

In the alternative arrangement of FIG. 2 those components common to the components of FIG. 1 bear the same reference numerals. In this second embodiment there is no clutch provided between the propshaft and the differential. Instead the propshaft 23 is directly connected via the universal joint 29 to a free-running differential 40. The propshaft 23 is decoupled from (and reconnected to) the rear wheels 14, 15 by the action of a clutch mechanism 41 incorporated within the differential 40. This clutch mechanism 41 is under the control of the controller 31.

This second embodiment operates in a similar fashion to that of the first with the electric motor 28 spinning up the propshaft 23, transmission 24 and those components of the differential 40 which are not isolated by the action of the clutch 41 to the appropriate rotational speed prior to the change to four wheel drive capability through the engagement of the PTO clutch 22 and differential clutch 41.

The embodiment of FIG. 2 can also perform in hybrid mode and may include optional clutches 2, 3 (shown ghosted) positioned either side of the electric motor 28 for enabling a hybrid drive capability with partial driveline disconnect in a two wheel drive mode.

Figure 3:
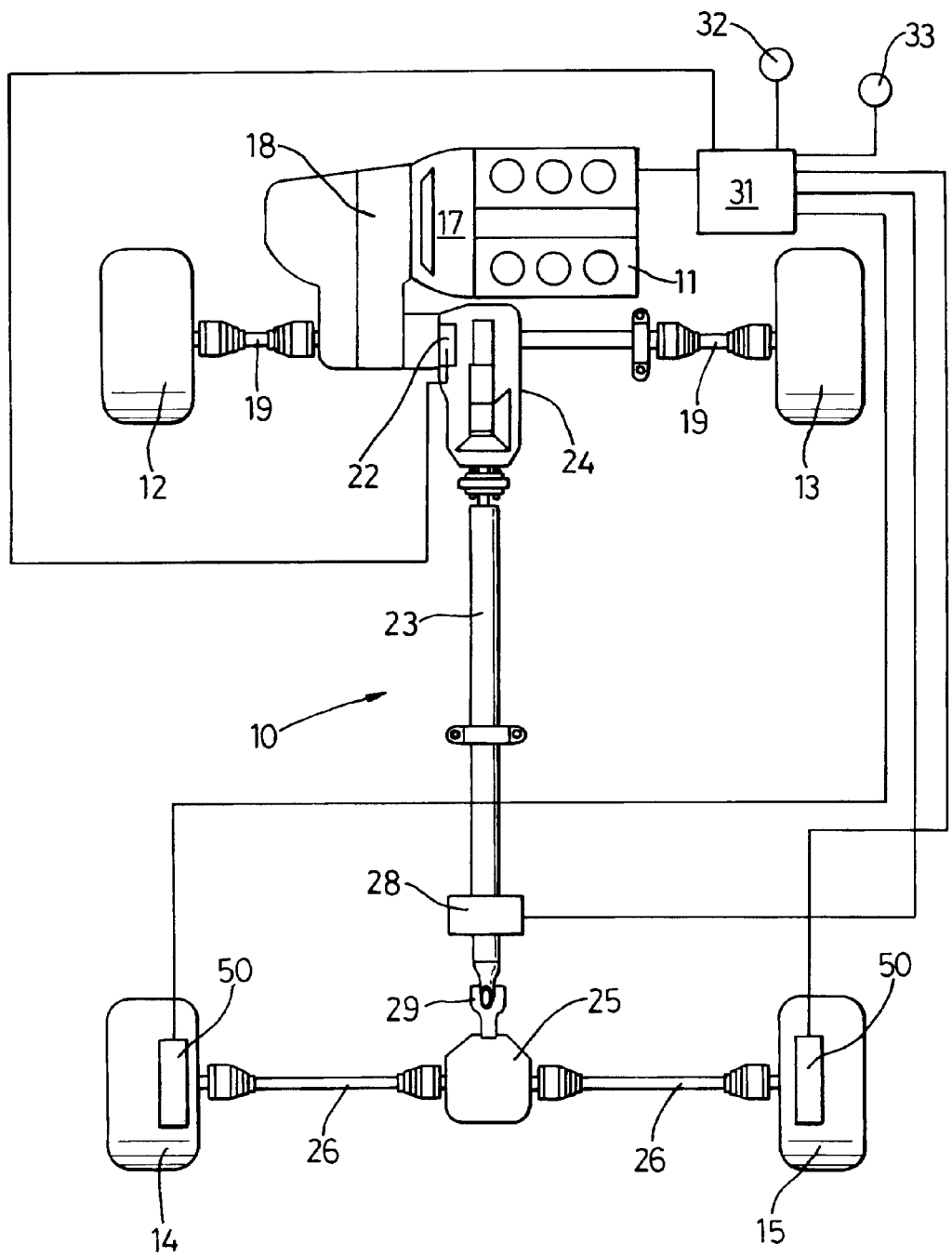
FIG. 3 is a schematic drawing of the driveline of a third example.

In the third embodiment of FIG. 3, those components common to the components of FIG. 1 bear the same reference numerals. In this third embodiment, the propshaft 23 is decoupled from (and reconnected to) the rear wheels 14, 15 by means of hub clutches 50 housed within the hub of each rear wheel 14, 15. Such hub clutches can be in the form of a wet clutch or an electronically operated clutch device including friction clutches and dog clutches.

This third embodiment provides the maximum fuel economy benefit while the vehicle is in two wheel drive mode because the transmission 24, the propshaft 23, the differential 25 and the rear drive shafts 26 are all stationary.

On changing over to four wheel drive mode, the electric motor 28 spins up the propshaft 23 (and the connected driveline components) to the appropriate speed and subsequently, the controller 31 initiates re-engagement of the PTO clutch 22 and hub clutches 50.

This embodiment is capable of operating as a hybrid vehicle in four wheel drive mode.

Figure 4:
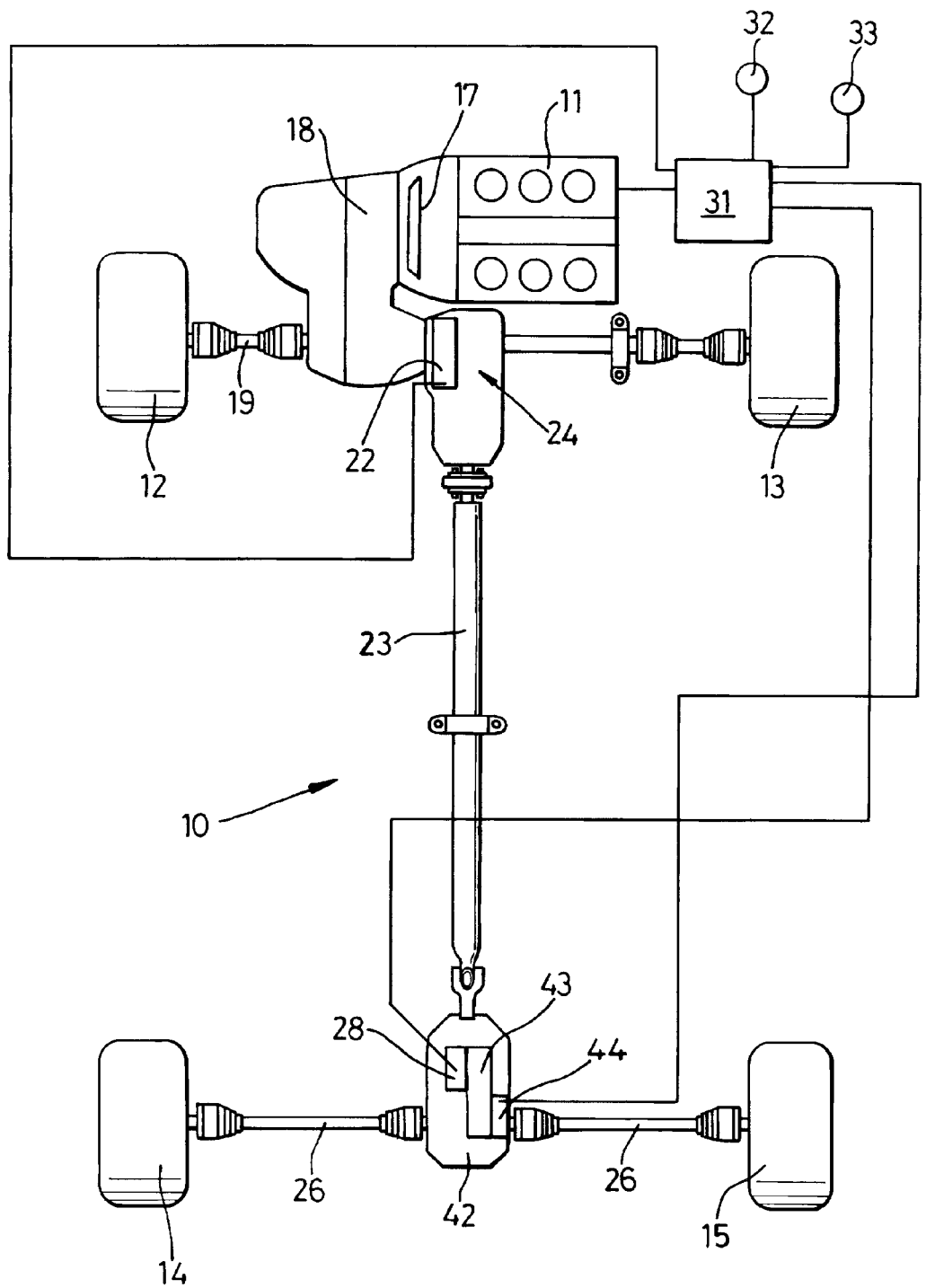
FIG. 4 is a schematic drawing of the driveline of a fourth example.

In the fourth embodiment of FIG. 4, those components common to the components of FIG. 1 bear the same reference numerals. In this alternative embodiment, the electric motor 28 is housed within the differential 42 and connected to a crown wheel 43. A clutch 44 incorporated in the differential 42 serves to isolate the crown wheel 43, and propshaft 23 from the drive shafts 26 when the vehicle is in two wheel drive mode.

On changing over to four wheel drive, the electric motor 28 spins up the crown wheel 43 and the propshaft 23 to the appropriate speed. Then the controller 31 initiates re-engagement of the PTO clutch 22 and the differential clutch 44.

This configuration shown in FIG. 4 allows a hybrid drive capability in two wheel drive or four wheel drive mode.

Figure 5:
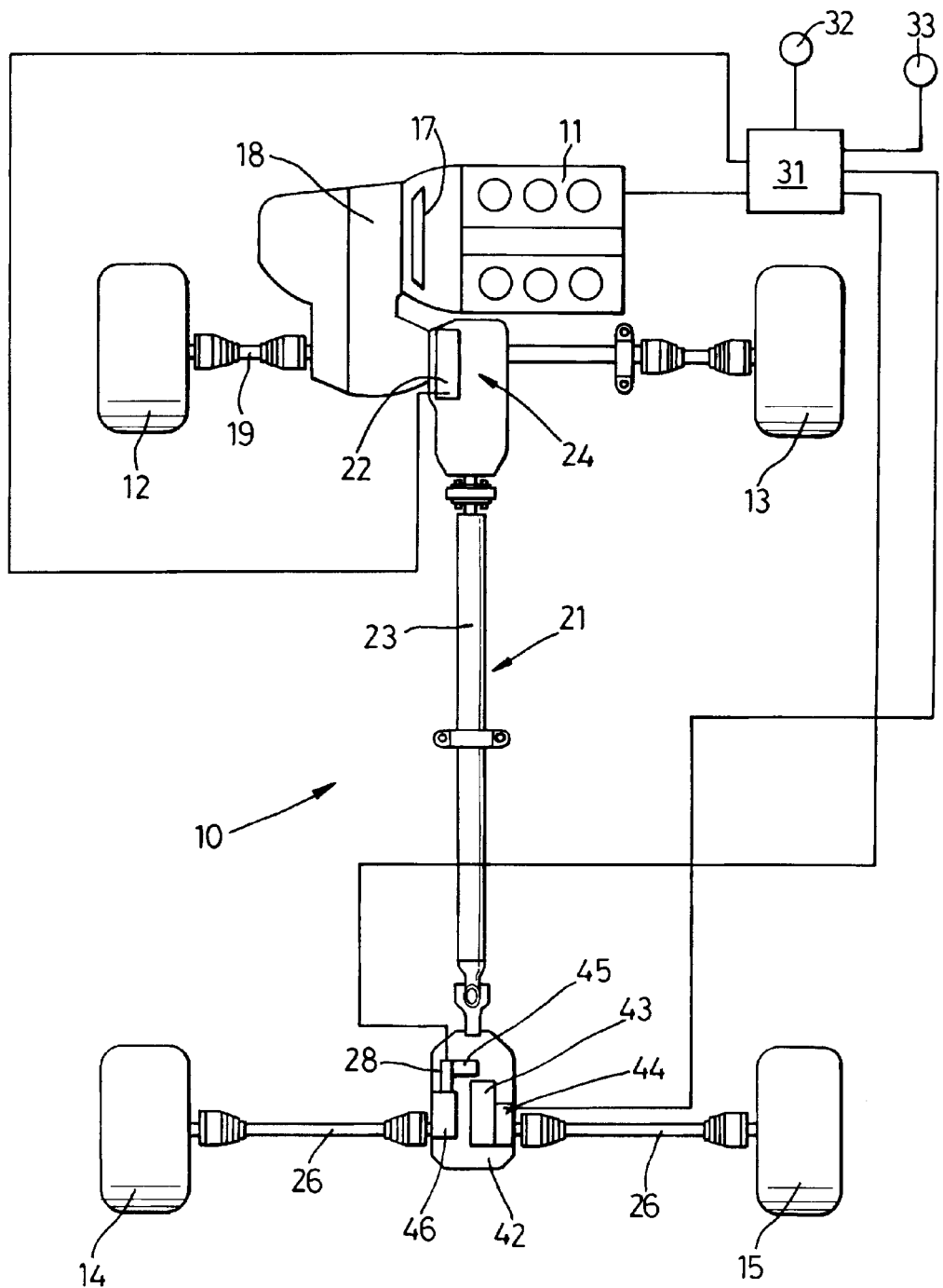
FIG. 5 is a schematic drawing of the driveline of a fifth embodiment.

In the further alternative arrangement of FIG. 5, those components common to the components of FIG. 4 bear the same reference numerals. Two further clutches are incorporated in the differential to enhance the hybrid drive capability.

In this embodiment, the motor 28 is connected to the crown wheel 43 via a clutch 45. A further clutch 46 is provided between the motor 28 and the carrier of the differential components (not shown).

As in the fourth embodiment, the clutch 44 serves to isolate the crown wheel 43 and propshaft 23 from the drive shafts 26 in two wheel drive mode.

On changing over to four wheel drive with the clutch 45 closed and the clutch 46 open, the electric motor 28 spins up the crown wheel 43 and propshaft 23 to the appropriate speed. Then the controller 31 initiates re-engagement of the PTO clutch 22 and the differential clutch 44.

The additional clutches 45, 46 permit electric drive to the rear wheels whilst the rest of the driveline is disconnected i.e. clutches 44 and 45 being disengaged, and clutch 46 being closed.

A similar motor and clutch arrangement could be incorporated in the transmission assembly 24 instead of the differential of FIG. 5.

We claim:

1. A motor vehicle having an engine, two pairs of wheels, a driveline to connect the engine to the wheels such that one pair of wheels is driven by the vehicle engine when the vehicle is in a two wheel drive mode and the other pair of wheels is additionally connected to the engine when the vehicle is in a four wheel drive mode, the driveline including an auxiliary driveline which includes a first clutch means to connect to the engine, a differential downstream of the first clutch means, a propshaft connected between the first clutch means and the differential, and releasable torque transmitting means operable to connect and disconnect drive from the propshaft to said other pair of wheels, the vehicle further including an electric motor coupled to the auxiliary driveline, and control means operable to switch the vehicle between the four wheel drive and the two wheel drive modes such that in the two wheel drive mode the propshaft is disconnected from both the engine and said other pair of wheels and when switching the vehicle from the two wheel drive mode to the four wheel drive mode while the vehicle is moving the control means firstly activates the electric motor causing it to spin the propshaft up to a predetermined speed, and subsequently operates the first clutch means and the releasable torque transmitting means to connect the auxiliary driveline to the engine and to said other pair of wheels.

2. A motor vehicle as claimed in claim 1, wherein the first clutch means comprises a wet clutch.

3. A motor vehicle as claimed in claim 1, wherein the releasable torque transmitting means comprises second clutch means located between the differential and the second pair of wheels.

4. A motor vehicle as claimed in claim 1, wherein the releasable torque transmitting means is incorporated within the differential.

5. A motor vehicle as claimed in claim 4, wherein the differential comprises a free running differential.

6. A motor vehicle as claimed in claim 1, wherein the releasable torque transmitting means comprises a second clutch located between the propshaft and the differential.

7. A motor vehicle as claimed in claim 1, wherein the control means further includes a driver operable switch which allows the driver to select a desired drive mode from the two wheel drive mode and the four wheel drive mode.

8. A motor vehicle as claimed in claim 1, in which the control means is configured to receive signals indicative of vehicle operating conditions and is operable to switch from the two wheel drive mode to the four wheel drive mode when various vehicle operating parameters have been detected.

9. A motor vehicle as claimed in claim 1, wherein the control means is configured to compute the predetermined speed from measurements provided by an on-board wheel sensor.

10. A motor vehicle as claimed in claim 1, wherein the engine, on receiving a signal from the control means, is configured to increase its torque output to match the torque absorbed by the auxiliary driveline on reconnection thereof.

11. A motor vehicle as claimed in claim 1, wherein the electric motor is coupled to the propshaft via a coupling arrangement which includes an epicyclic gearing system.

12. A motor vehicle as claimed in claim 11, wherein the coupling arrangement includes a clutch mechanism.

13. A motor vehicle as claimed in claim 1, wherein the differential incorporates a crown wheel and the electric motor is connected to said crown wheel.

14. A motor vehicle as claimed in claim 13, in which the electric motor is connected to the crown wheel via a clutch arrangement.

15. A method of controlling a change in the transmission of torque from a motor vehicle engine to the driving wheels in a motor vehicle having a driveline and two pairs of wheels, one pair of wheels being driven by the engine when the vehicle is in a two wheel drive mode and the other pair of wheels being additionally connected to the engine when the vehicle is in a four wheel drive mode, the driveline including an auxiliary driveline and an electric motor coupled thereto, the auxiliary driveline including a first clutch means to connect to the engine, a differential downstream of the first clutch means, releasable torque transmitting means operable to connect and disconnect the drive from the differential to said other pair of wheels, and a propshaft connected between the first clutch means and the differential, wherein the propshaft is disconnected from both the engine and said other wheels when the vehicle is in two wheel drive mode and, on switching the vehicle from two wheel drive mode to the four wheel drive mode while the vehicle is moving, the electric motor rotates the propshaft until a predetermined rotational speed is reached, whereupon the auxiliary driveline is reconnected to the engine and to said other pair of wheels.

16. A driveline system for a motor vehicle having an engine and two pairs of wheels, the system comprising:
a driveline to connect the engine to the wheels such that one pair of wheels is driven by the vehicle engine when the vehicle is in a two wheel drive mode and wherein the other pair of wheels is additionally connected to the engine when the vehicle is in a four wheel drive mode,
an auxiliary driveline which includes a first clutch to connect to the engine, a differential downstream of the first clutch, a propshaft connected between the first clutch and the differential, and a second clutch operable to connect and disconnect the propshaft to said other pair of wheels,
an electric motor coupled to the auxiliary driveline, and
a controller operable to switch the vehicle between the four wheel drive mode and the two wheel drive mode such that in the two wheel drive mode the propshaft is disconnected from both the engine and said other pair of wheels and when switching the vehicle from the two wheel drive mode to the four wheel drive mode while the vehicle is moving the electric motor is activated to spin the propshaft to a predetermined speed, and subsequently said controller operates the first clutch and the second clutch to connect the auxiliary driveline to the engine and to said other pair of wheels.

17. A motor vehicle as claimed in claim 16, wherein the first clutch comprises a wet clutch.

18. A motor vehicle as claimed in claim 16, wherein the second clutch is incorporated within the differential.

19. A motor vehicle as claimed in claim 16, wherein the differential comprises a free running differential.

20. A motor vehicle as claimed in claim 16, wherein the controller further includes a driver operable switch which allows the driver to select a desired drive mode from the two wheel drive mode and the four wheel drive mode.

21. A motor vehicle as claimed in claim 16, in which the controller is configured to receive signals indicative of vehicle operating conditions and is operable to switch from the two wheel drive mode to the four wheel drive mode when various vehicle operating parameters have been detected.

22. A motor vehicle as claimed in claim 16, wherein the controller is configured to compute the predetermined speed from measurements provided by an on-board wheel sensor.

23. A motor vehicle as claimed in claim 16, wherein the engine, on receiving a signal from the controller, is configured to increase its torque output to match the torque absorbed by the auxiliary driveline on reconnection thereof.

24. A motor vehicle as claimed in claim 16, wherein the electric motor is coupled to the propshaft via a coupling arrangement which includes an epicyclic gearing system.

25. A motor vehicle as claimed in claim 24, wherein the coupling arrangement includes a clutch mechanism.

26. A motor vehicle as claimed in claim 16, wherein the differential incorporates a crown wheel and the electric motor is connected to said crown wheel.

27. A motor vehicle as claimed in claim 26, in which the electric motor is connected to the crown wheel via a clutch arrangement.

* * * * *